US012670328B2

(12) United States Patent
Wang

(10) Patent No.: US 12,670,328 B2
(45) Date of Patent: Jun. 30, 2026

(54) COREFERENCE RESOLUTION METHOD, AND METHOD AND APPARATUS FOR TRAINING COREFERENCE RESOLUTION MODEL

(71) Applicant: BOE TECHNOLOGY GROUP CO., LTD., Beijing (CN)

(72) Inventor: Bingqian Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 267 days.

(21) Appl. No.: 18/578,985

(22) PCT Filed: Sep. 28, 2022

(86) PCT No.: PCT/CN2022/122028
§ 371 (c)(1),
(2) Date: Jan. 12, 2024

(87) PCT Pub. No.: WO2023/087935
PCT Pub. Date: May 25, 2023

(65) Prior Publication Data
US 2024/0320437 A1      Sep. 26, 2024

(30) Foreign Application Priority Data
Nov. 22, 2021    (CN) .......................... 202111383634.6

(51) Int. Cl.
*G06F 40/30*          (2020.01)
*G06F 16/3329*        (2025.01)

(52) U.S. Cl.
CPC .......... *G06F 40/30* (2020.01); *G06F 16/3329* (2019.01)

(58) Field of Classification Search
CPC .............................. G06F 40/30; G06F 16/3329
See application file for complete search history.

(56) References Cited

U.S. PATENT DOCUMENTS

| | | | |
|---|---|---|---|
| 2021/0027771 A1 | 1/2021 | Hall et al. | |
| 2022/0075958 A1* | 3/2022 | Zeng ................... | G06N 3/0464 |

FOREIGN PATENT DOCUMENTS

| | | |
|---|---|---|
| CN | 108549662 A | 9/2018 |
| CN | 111858894 A | 10/2020 |

(Continued)

OTHER PUBLICATIONS

Hao et al., Robust Dialogue Utterance Rewriting as Sequence Tagging, 2020, arXiv, whole document (Year: 2020).*

(Continued)

*Primary Examiner* — Sonia L Gay
(74) *Attorney, Agent, or Firm* — WHDA, LLP

(57)          ABSTRACT

A coreference resolution method, and a method and apparatus for training a coreference resolution model are provided. The coreference resolution method includes: acquiring a current utterance to be processed; inputting the current utterance into a coreference resolution detection sub-model to obtain a predicted insertion position where there is a semantic absence of the current utterance and/or a predicted deletion position of a word to be replaced; and inputting the predicted insertion position and/or the predicted deletion position of the current utterance, and a historical conversation corresponding to the current utterance into a resolution completion sub-model of the coreference resolution model to obtain a predicted position in the historical utterance of a word corresponding to the semantic absence at the predicted insertion position and/or a predicted position in the historical utterance of a replacement word corresponding to the word to be replaced at the predicted deletion position.

18 Claims, 6 Drawing Sheets

(56)         References Cited

FOREIGN PATENT DOCUMENTS

| | | |
|---|---|---|
| CN | 109783648 B | 12/2020 |
| CN | 112148847 A | 12/2020 |
| CN | 112183060 A | 1/2021 |
| CN | 112597777 A | 4/2021 |
| CN | 112951233 A | 6/2021 |
| CN | 112989043 A | 6/2021 |
| CN | 113609824 A | 11/2021 |
| CN | 114117001 A | 3/2022 |

OTHER PUBLICATIONS

Miculicich et al., Partially Supervised Mention Detection, 2020, Proceedings of the 3rd Workshop on Computational Models of Reference, Anaphora and Coreference (CRAC 2020), 91-98 (Year: 2020).*

Park et al., Fast End-to-end Coreference Resolution for Korean, 2020, Findings of the Association for Computational Linguistics EMNLP 2020, pp. 2610-2624 (Year: 2020).*

Pilault et al., Conditionally Adaptive Multi-Task Learning: Improving Transfer Learning in NLP Using Fewer Parameters and Less Data, 2021, arXiv, whole document (Year: 2021).*

Iwata et al., Zero Pronouns Identification based on Span Prediction, 2021, Proceedings of the Joint Conference of the 59th Annual Meeting of the Association for Computational Linguistics and the 11thInternational Joint Conference on Natural Language Processing, p. 331-336 (Year: 2021).*

Literature review on referential elimination, CSDN Blog, published Jan. 2, 2019, with English translation. (5 pages).

* cited by examiner

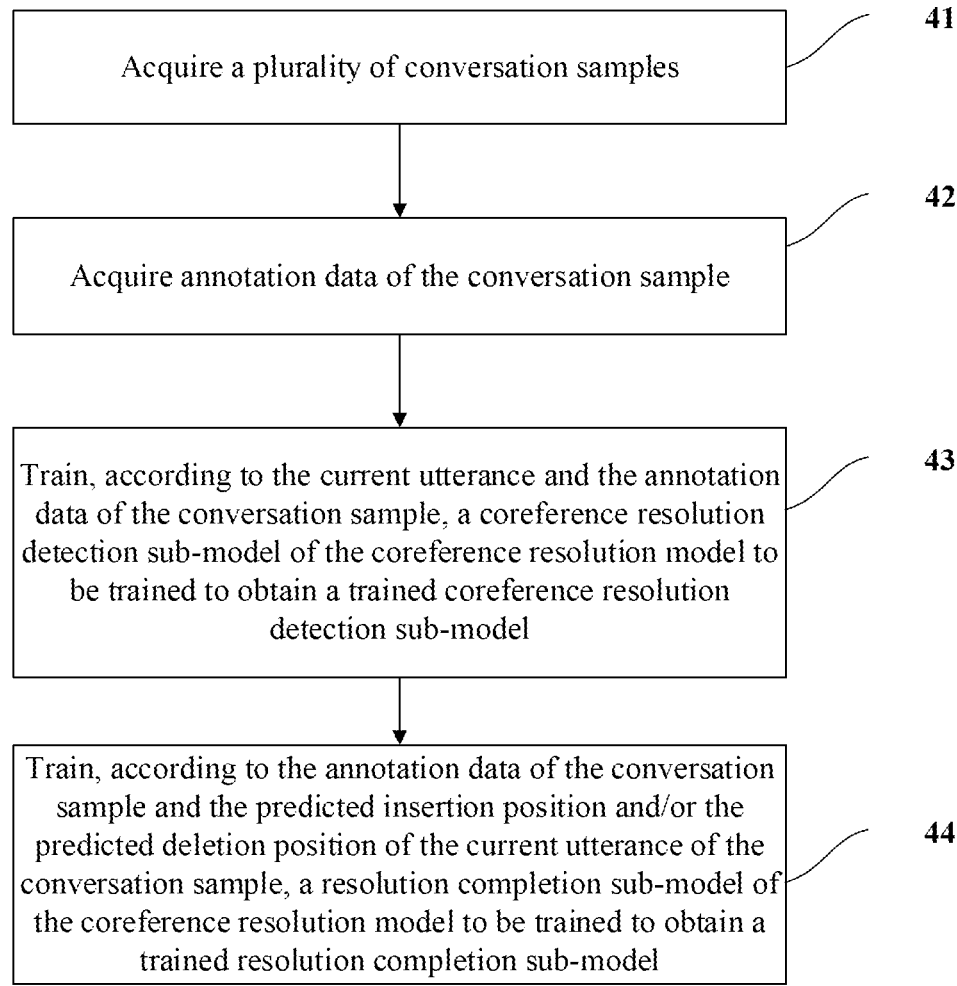

Acquire a plurality of conversation samples — 41

Acquire annotation data of the conversation sample — 42

Train, according to the current utterance and the annotation data of the conversation sample, a coreference resolution detection sub-model of the coreference resolution model to be trained to obtain a trained coreference resolution detection sub-model — 43

Train, according to the annotation data of the conversation sample and the predicted insertion position and/or the predicted deletion position of the current utterance of the conversation sample, a resolution completion sub-model of the coreference resolution model to be trained to obtain a trained resolution completion sub-model — 44

COREFERENCE RESOLUTION METHOD, AND METHOD AND APPARATUS FOR TRAINING COREFERENCE RESOLUTION MODEL

CROSS-REFERENCE TO RELATED APPLICATIONS

This application is the U.S. national phase of PCT Application PCT/CN2022/122028 filed on Sep. 28, 2022, which claims priority to Chinese Patent Application No. 202111383634.6 filed in China on Nov. 22, 2021, the entire contents of which are hereby incorporated by reference.

TECHNICAL FIELD

Embodiments of the present disclosure relate to the technical field of artificial intelligence, and in particular, to a coreference resolution method, a method and apparatus for training a coreference resolution model.

BACKGROUND

Human-computer conversation is an important research direction in the field of artificial intelligence. In recent years, it has attracted much attention in both academic and industrial circles, and has made remarkable progress in the algorithm technology. It is widely used in intelligent speakers, customer service robots and other products.

In current utterance systems (e.g., intelligent customer service robots, intelligent speakers, etc.), there are ambiguous sentences with incomplete information due to the spoken expression of human beings. One way to solve this problem is to perform information completion and coreference resolution of current incomplete fuzzy statements by using the context information of the conversation, and to resolve the fuzzy problem, which is also called rewriting. However, the existing coreference resolution scheme is very good in the processing of single-round conversation statements, but poor in multi-round conversation statements.

SUMMARY

Embodiments of the present disclosure provide a coreference resolution method, a training method and apparatus for a coreference resolution model for solving the problem that existing coreference resolution schemes perform poorly in multi-round conversations.

In order to solve the above technical problem, the present disclosure is implemented as follows:

In a first aspect, an embodiment of the present disclosure provides a coreference resolution method, comprising:

acquiring a current utterance to be processed;

inputting the current utterance into a coreference resolution detection sub-model of a coreference resolution model to obtain a predicted insertion position where there is a semantic absence of the current utterance and/or a predicted deletion position of a word to be replaced; and inputting the predicted insertion position and/or the predicted deletion position of the current utterance, and a historical conversation corresponding to the current utterance into a resolution completion sub-model of the coreference resolution model to obtain a predicted position in the historical utterance of a word corresponding to the semantic absence at the predicted insertion position and/or a predicted position in the historical utterance of a replacement word corresponding to the word to be replaced at the predicted deletion position.

Optionally, the coreference resolution detection sub-model comprises two binary classification networks, wherein one binary classification network is input with the current utterance and outputs a 01 sequence for indicating whether the position of each word in the current utterance is a starting position or an ending position of the predicted insertion position, and the other binary classification network is input with the current utterance and outputs a 01 sequence for indicating whether the position of each word in the current utterance is a starting position or an ending position of the predicted deletion position.

Optionally, the binary classification network uses the following formula to determine whether the position of each word in the current utterance is a starting position or an ending position of the predicted insertion position or the predicted deletion position:

$$p_i^{s-l} = \sigma\left(W_s^l h_1[i] + b_s^l\right)$$

$$p_i^{e-l} = \sigma\left(W_e^l h_1[i] + b_e^l\right)$$

where l represents the predicted insertion position or the predicted deletion position, $$p_i^{s-l}$$

represents a starting position, $$p_i^{e-l}$$

represents an ending position, $h_l[i]$ is an encoded vector representation of an i-th word in the current utterance after passing through a transformer encoder, $$W_s^l$$

and $$W_e^l$$

represent weight vectors, $$b_s^l$$

and $$b_e^l$$

represent bias terms, and $\sigma$ is a sigmoid activation function.

Optionally, the inputting the predicted insertion position and/or the predicted deletion position of the current utterance, and a historical conversation corresponding to the current utterance into a resolution completion sub-model of the coreference resolution model to obtain a predicted position in the historical utterance of a word corresponding to the semantic absence at the predicted insertion position and/or a predicted position in the historical utterance of a replacement word corresponding to the word to be replaced at the predicted deletion position, comprises:

calculating a mean vector of a starting position and an ending position of the predicted insertion position and/or a mean vector of a starting position and an ending position of the predicted deletion position of the current utterance;

taking the mean vector as a condition, performing semantic processing on an encoded vector obtained by encoding the current utterance by a transformer encoder by means of conditional layer normalization to obtain a conditional layer normalized semantic output variable; and inputting the semantic output variable and the historical utterance of the current utterance into the resolution completion sub-model to obtain a predicted position in the historical utterance of a word corresponding to the semantic absence at the predicted insertion position and/or a predicted position in the historical utterance of a replacement word corresponding to the word to be replaced at the predicted deletion position.

Optionally, the semantic output variable can be represented as:

$$H_{cln} = \lambda \times (h_{l-1} - \mu_h)/(\sigma_h + \varepsilon) + \beta$$

where $H_{cln}$ is the semantic output variable;

$h_{l-1}$ is an encoded vector obtained by encoding the current utterance by the transformer encoder;

$\lambda = \varphi_\lambda(H_c) + \lambda$, $H_c$ is the mean vector;

$\beta = \varphi_\beta(H_c) + \beta$, $\varphi_\beta$ and $\varphi_\lambda$ are two transformation matrices whose function is to transform the dimension of an input mean vector into a dimension consistent with $\lambda$ and $\beta$;

$H_c = \text{avg}(h_l[s], h_l[e])$, avg( ) represents a mean function, s represents a starting position, and e represents an ending position, and $h_1$ is an encoded vector obtained by encoding the input by the transformer encoder;

$\mu_h$ and $\sigma_h$ are a mean value and a variance of feature vectors of different dimensions of the encoded vector corresponding to the current utterance at the current layer, $$\mu_h = 1/H \sum_{k=1}^{H} h_{l-1}, \ \sigma_h = \sqrt{1/H \sum_{k=1}^{H} (h_{l-1} - \mu_h)^2},$$

H being a hidden layer dimension, and k being equal to 1 to H;

$\varepsilon$ is a minimum.

Optionally, the resolution completion sub-model determines the predicted position in the historical utterance using the following formula:

$$p_s = \text{softmax}(W_s H_{cln} + b_s)$$
$$p_e = \text{softmax}(W_e H_{cln} + b_e)$$

where $p_s$ is a starting position of the predicted position in the historical utterance, $p_e$ is an ending position of the predicted position in the historical utterance, softmax is a normalized exponential function, $W_s$ and $W_e$ represent weight vectors, $b_s$ and $b_e$ represent bias terms, and $H_{cln}$ is the semantic output variable.

In a second aspect, an embodiment of the present disclosure provides a method for training a coreference resolution model, comprising:

acquiring a plurality of conversation samples, wherein each of the conversation samples comprises a historical utterance, a current utterance and a reference utterance of the current utterance, and the reference utterance is an utterance after semantic deletion completion and/or coreference resolution of the current utterance;

acquiring annotation data of the conversation sample, wherein the annotation data comprises: a real insertion position where there is a semantic absence and/or a real deletion position of a word to be replaced in the current utterance, and a real position in the historical utterance of a word corresponding to the semantic absence at the real insertion position and/or a real position in the historical utterance of a replacement word corresponding to the word to be replaced at the real deletion position;

training, according to the current utterance and the annotation data of the conversation sample, a coreference resolution detection sub-model of the coreference resolution model to be trained to obtain a trained coreference resolution detection sub-model, wherein the trained coreference resolution detection sub-model is input with an utterance, and outputs a predicted insertion position where there is a semantic absence and/or a predicted deletion position of a word to be replaced in the input utterance;

training, according to the annotation data of the conversation sample and the predicted insertion position and/or the predicted deletion position of the current utterance of the conversation sample, a resolution completion sub-model of the coreference resolution model to be trained to obtain a trained resolution completion sub-model, wherein the trained resolution completion sub-model is input with a predicted insertion position and/or a predicted deletion position of the utterance, and outputs a predicted position in the historical utterance of the input utterance of a word corresponding to the semantic absence at the predicted insertion position and/or a predicted position in the historical utterance of the input utterance of a replacement word corresponding to the word to be replaced at the predicted deletion position.

Optionally, the acquiring annotation data of the conversation sample comprises:

matching a sub-string in the current utterance of the conversation sample with a sub-string in the reference utterance to obtain a matching result;

if the matching result is that a sub-string only exists in the current utterance, determining that the sub-string is a word to be replaced, and a real deletion position of the word to be replaced in the current utterance, finding a replacement font corresponding to the word to be replaced in the reference utterance, and marking a real position in the historical utterance of a replacement word corresponding to the word to be replaced in the historical utterance at the real deletion position; and if the matching result is that a sub-string only exists in the reference utterance, determining that there is a semantic absence in the current utterance, and determining a real insertion position where there is a semantic absence in the current utterance.

Optionally; training, according to the current utterance and the annotation data of the conversation sample, a coreference resolution detection sub-model of the coreference resolution model to be trained comprises:

an input step: inputting the current utterance of the conversation sample into the coreference resolution detection sub-model to obtain a predicted insertion position where there is a semantic absence of the current utterance and/or a predicted deletion position of a word to be replaced;

determining a value of a first objective function according to the predicted insertion position and/or the predicted deletion position output by the coreference resolution detection sub-model and a real insertion position and/or a real deletion position of the current utterance; and if the value of the first objective function does not satisfy a first condition, adjusting parameters of the coreference resolution detection sub-model, and returning to the input step until the value of the first objective function satisfies the first condition, so as to obtain the trained coreference resolution detection sub-model.

Optionally, the coreference resolution detection sub-model comprises two binary classification networks, wherein one binary classification network is input with the current utterance and outputs a 01 sequence for indicating whether the position of each word in the current utterance is a starting position or an ending position of the predicted insertion position, and the other binary classification network is input with the current utterance and outputs a 01 sequence for indicating whether the position of each word in the current utterance is a starting position or an ending position of the predicted deletion position.

Optionally, the binary classification network uses the following formula to determine whether the position of each word in the current utterance is a starting position or an ending position of the predicted insertion position or the predicted deletion position:

$$p_i^{s\_l} = \sigma\left(W_s^l h_1[i] + b_s^l\right)$$

$$p_i^{e\_l} = \sigma\left(W_e^l h_1[i] + b_e^l\right)$$

where l represents the predicted insertion position or the predicted deletion position, $$p_i^{s\_l}$$

represents a starting position, $$p_i^{e\_l}$$

represents an ending position, $h_l[i]$ is an encoded vector representation of an i-th word in the current utterance after passing through a transformer encoder, $$W_s^l$$

and $$W_e^l$$

represent weight vectors to be trained, $$b_s^l$$

and $$b_e^l$$

represent bias terms to be trained, and σ is a sigmoid activation function.

Optionally, the first objective function is expressed as follows:

$$\text{loss}_{tag} = -\sum_{i=1}^{n+2} y_i^{s\_l} \log\left(p_i^{s\_l}\right) - \sum_{j=1}^{n+2} y_j^{e\_l} \log\left(p_j^{e\_l}\right)$$

where $\text{loss}_{tag}$ is the first objective function, n is the length of the current utterance, $$p_i^{s\_l}$$

represents the starting position of the predicted insertion position or the predicted deletion position, $$p_j^{e\_l}$$

represents an ending position of the predicted insertion position or the predicted deletion position of the current utterance, $$y_i^{s\_l}$$

represents the starting position of the real insertion position or the real deletion position of the current utterance, $$y_j^{e\_l}$$

represents the ending position of the real insertion position or the real deletion position of the current utterance, i represents the i-th word in the current utterance, and j represents the j-th word in the current utterance.

Optionally, training, according to the annotation data of the conversation sample and the predicted insertion position and/or the predicted deletion position of the current utterance of the conversation sample, a resolution completion sub-model of the coreference resolution model to be trained comprises:

a preprocessing step: calculating a mean vector of a starting position and an ending position of the predicted insertion position and/or a mean vector of a starting position and an ending position of the predicted deletion position of the current utterance; and taking the mean vector as a condition, performing semantic processing on an encoded vector obtained by encoding the current utterance by a transformer encoder by means of conditional layer normalization to obtain a conditional layer normalized semantic output variable; and an input step: inputting the semantic output variable and the historical utterance of the conversation sample into the resolution completion sub-model to obtain a predicted position in the historical utterance of a word corresponding to the semantic absence at the predicted insertion position and/or a predicted position in the historical utterance of a replacement word corresponding to the word to be replaced at the predicted deletion position; determining a value of a second objective function according to the predicted position and the real position in the historical utterance; and if the value of the second objective function does not satisfy a second condition, adjusting parameters of the resolution completion sub-model, and returning to the input step until the value of the second objective function satisfies the second condition, so as to obtain the trained resolution completion sub-model.

Optionally, the semantic output variable can be represented as:

$$H_{cln} = \lambda \times (h_{l-1} - \mu_h)/(\sigma_h + \varepsilon) + \beta$$

where $H_{cln}$ is the semantic output variable;

$h_{l-1}$ is an encoded vector obtained by encoding the current utterance by the transformer encoder;

$\lambda = \varphi_\lambda(H_c) + \lambda$, $H_c$ is the mean vector;

$\beta = \varphi_\beta(H_c) + \beta$, $\varphi_\beta$ and $\varphi_\lambda$ are two transformation matrices whose function is to transform the dimension of an input mean vector into a dimension consistent with $\lambda$ and $\beta$;

$H_c = avg(h_l[s], h_l[e])$, $avg(\ )$ represents a mean fraction, s represents a starting position, and e represents an ending position, and $h_l$ is an encoded vector obtained by encoding the input by the transformer encoder;

$\mu_h$ and $\sigma_h$ are a mean value and a variance of feature vectors of different dimensions of the encoded vector corresponding to the current utterance at the current layer, $$\mu_h = 1/H \sum_{k=1}^{H} h_{l-1}, \ \sigma_h = \sqrt{1/H \sum_{k=1}^{H} (h_{l-1} - \mu_h)^2},$$

H being a hidden layer dimension, and k being equal to 1 to H;

$\varepsilon$ is a minimum.

Optionally, the resolution completion sub-model determines the predicted position in the historical utterance using the following formula:

$$p_s = softmax(W_s H_{cln} + b_s)$$

$$p_e = softmax(W_e H_{cln} + b_e)$$

where $p_s$ is a starting position of the predicted position in the historical utterance, $p_e$ is an ending position of the predicted position in the historical utterance, softmax is a normalized exponential fraction, $W_s$ and $W_e$ represent weight vectors to be trained, $b_s$ and $b_e$ represent bias terms to be trained, and $H_{cln}$ is the semantic output variable.

Optionally, the second objective function is expressed as follows:

$$loss_{mrc} = -\sum_{i=1}^{n+2} y_s \ log(p_s) - \sum_{j=1}^{n+2} y_e \ log(p_e)$$

where $loss_{mrc}$ is the second objective function, n is the length of the historical utterance, $p_s$ represents the starting position of the predicted position of the historical utterance, $p_e$ represents the ending position of the predicted position of the historical utterance, $y_s$ represents a starting position of the real position of the historical utterance, $y_e$ represents the ending position of the real position of the historical utterance, i represents the i-th word in the historical utterance, and j represents the j-th word in the historical utterance.

In a third aspect, an embodiment of the present disclosure provides a coreference resolution apparatus, comprising:

a first acquisition module for acquiring a current utterance to be processed;

a first processing module for inputting the current utterance into a coreference resolution detection sub-model of a coreference resolution model to obtain a predicted insertion position where there is a semantic absence of the current utterance and/or a predicted deletion position of a word to be replaced; and a second processing module for inputting the predicted insertion position and/or the predicted deletion position of the current utterance, and a historical conversation corresponding to the current utterance into a resolution completion sub-model of the coreference resolution model to obtain a predicted position in the historical utterance of a word corresponding to the semantic absence at the predicted insertion position and/or a predicted position in the historical utterance of a replacement word corresponding to the word to be replaced at the predicted deletion position.

In a fourth aspect, an embodiment of the present disclosure provides an apparatus for training a coreference resolution model, comprising:

a first acquisition module for acquiring a plurality of conversation samples, wherein each of the conversation samples comprises a historical utterance, a current utterance and a reference utterance of the current utterance, and the reference utterance is an utterance after semantic deletion completion and/or coreference resolution of the current utterance;

a second acquisition module for acquiring annotation data of the conversation sample, wherein the annotation data comprises: a real insertion position where there is a semantic absence and/or a real deletion position of a word to be replaced in the current utterance, and a real position in the historical utterance of a word corresponding to the semantic absence at the real insertion position and/or a real position in the historical utterance of a replacement word corresponding to the word to be replaced at the real deletion position;

a first training module for training, according to the current utterance and the annotation data of the conversation sample, a coreference resolution detection sub-model of the coreference resolution model to be trained to obtain a trained coreference resolution detection sub-model, wherein the trained coreference resolution detection sub-model is input with an utterance, and outputs a predicted insertion position where there is a semantic absence and/or a predicted deletion position of a word to be replaced in the input utterance; and a second training module for training, according to the annotation data of the conversation sample and the predicted insertion position and/or the predicted deletion position of the current utterance of the conversation sample, a resolution completion sub-model of the coreference resolution model to be trained to obtain a trained resolution completion sub-model, wherein the trained resolution completion sub-model is input with a predicted insertion position and/or a predicted deletion position of the utterance, and outputs a predicted position in the historical utterance of the input utterance of a word corresponding to the semantic absence at the predicted insertion position and/or a predicted position in the historical utterance of the input utterance of a replacement word corresponding to the word to be replaced at the predicted deletion position.

In a fifth aspect, an embodiment of the present disclosure provides an electronic device comprising a processor, a memory, and a program or instructions stored on the memory and executable on the processor which, when executed by the processor, carry out the steps of the coreference resolution method described in the first aspect, or which, when executed by the processor, carry out the steps of the method for training a coreference resolution model described in the second aspect.

In a sixth aspect, an embodiment of the present disclosure provides a readable storage medium having stored thereon a program or instructions which, when executed by a processor, implement the steps of the coreference resolution method described in the first aspect or the method of training a coreference resolution model described in the second aspect.

In embodiments of the present disclosure, in the coreference resolution solution, the historical utterance of the current utterance to be processed is taken into account, solving the problem that existing coreference resolution schemes perform poorly in multi-round conversations.

BRIEF DESCRIPTION OF THE DRAWINGS

Various other advantages and benefits will become apparent to those skilled in the art upon reading the following detailed description of the preferred embodiments. The drawings are only for purposes of illustrating the preferred embodiments and are not to be construed as limiting the disclosure. Moreover, like reference numerals designate like parts throughout the several views. In the drawings:

FIG. 4 is a flow chart of a method for training a coreference resolution model according to an embodiment of the present disclosure;

DETAILED DESCRIPTION

The embodiments of the present disclosure will now be described more fully hereinafter with reference to the accompanying drawings, in which some, but not all embodiments of the disclosure are shown. Based on the embodiments in the present disclosure, all other embodiments obtained by a person skilled in the art in the art without inventive effort fall within the scope of the present disclosure.

First, the meaning of "coreference" below is briefly described: generally, in linguistics and everyday use, a short name or a substitute name is used hereinafter to replace a certain word which has appeared above, and this case is called "reference" in linguistics, i.e., coreference. Formally, the process of dividing different mentions representing the same entity into an equivalent set is called coreference resolution. Entity: an object that exists objectively in the real world. A mention refers to a representation of an entity.

Figure 1:
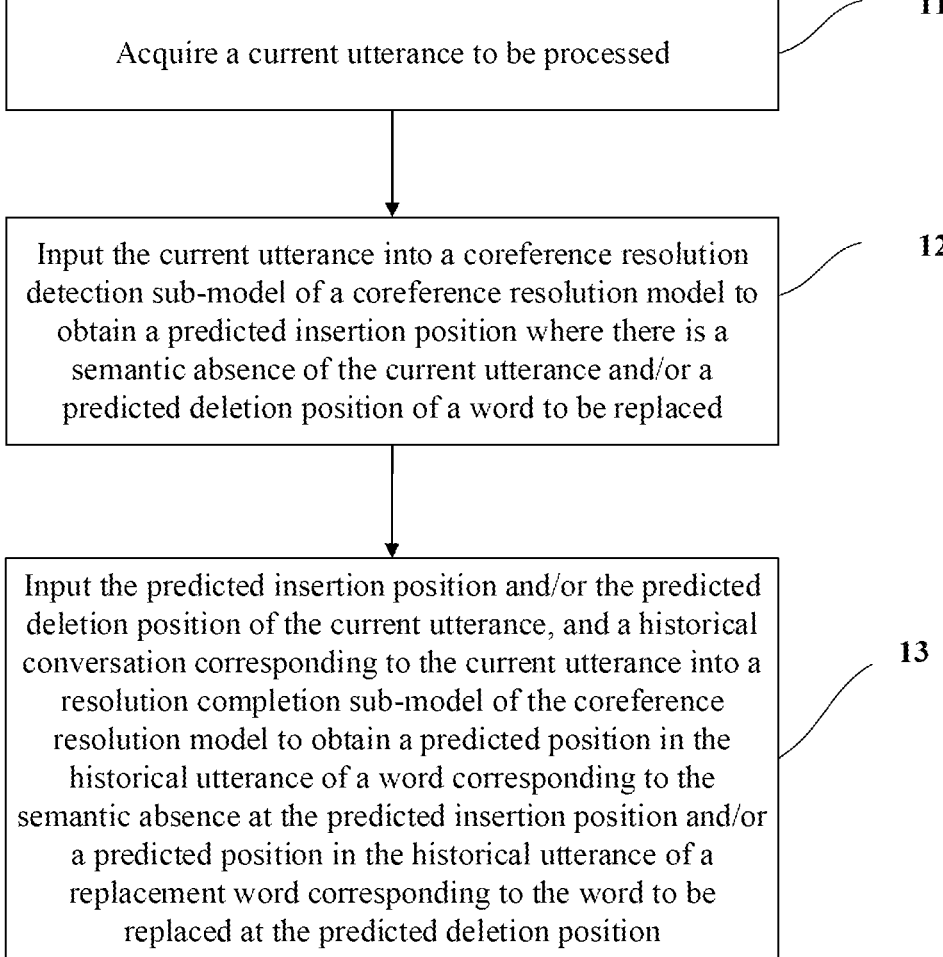
FIG. 1 is a flow chart of a coreference resolution method according to an embodiment of the present disclosure.

Referring to FIG. 1, the present disclosure further provides a coreference resolution method, comprising:

Step 11: acquiring a current utterance to be processed;

Step 12: inputting the current utterance into a coreference resolution detection sub-model of a coreference resolution model to obtain a predicted insertion position where there is a semantic absence of the current utterance and/or a predicted deletion position of a word to be replaced; and Step 13: inputting the predicted insertion position and/or the predicted deletion position of the current utterance, and a historical conversation corresponding to the current utterance into a resolution completion sub-model of the coreference resolution model to obtain a predicted position in the historical utterance of a word corresponding to the semantic absence at the predicted insertion position and/or a predicted position in the historical utterance of a replacement word corresponding to the word to be replaced at the predicted deletion position.

In embodiments of the present disclosure, in the coreference resolution solution, the historical utterance of the current utterance to be processed is taken into account, solving the problem that existing coreference resolution schemes perform poorly in multi-round conversations.

The implementation methods of the coreference resolution detection sub-model and the resolution completion sub-model are described below.

(1) Coreference Resolution Detection Sub-Model

The coreference resolution detection sub-model is used to detect a predicted insertion position where there is a semantic absence of an input current utterance and a predicted deletion position of a word to be replaced.

Optionally, the coreference resolution detection sub-model comprises two binary classification networks, wherein one binary classification network is input with the current utterance and outputs a 01 sequence for indicating whether the position of each word in the current utterance is a starting position or an ending position of the predicted insertion position, and the other binary classification network is input with the current utterance and outputs a 01 sequence for indicating whether the position of each word in the current utterance is a starting position or an ending position of the predicted deletion position.

For example, a multi-round conversation includes the following:

Utterance A: 是什么电影评分挺高啊？(What movie has such a high rating?)

Utterance B: 名字叫贫民窟的百万富翁，是洛夫琳坦丹导演的作品 (Slumdog Millionaire, a work of the director Loveleen Tandan)

Current Utterance: 还是算了吧，不喜欢这位导演. (Forget it, I do not like this director.)

Figure 2:
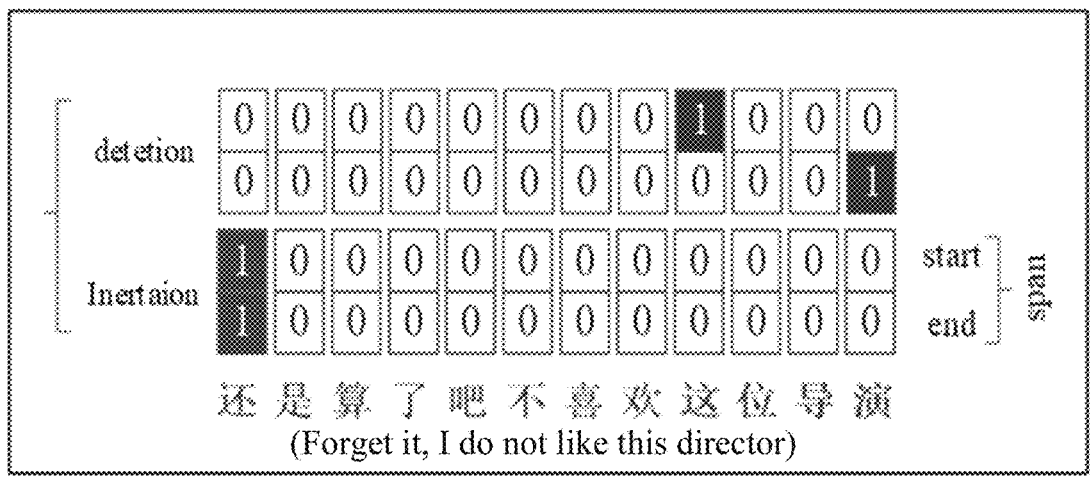
FIG. 2 is a schematic diagram of an output result of a coreference resolution detection sub-model according to an embodiment of the present disclosure.

The first two sentences are historical utterances, and "还是算了吧，不喜欢这位导演" (Forget it. I do not like this director) is the current utterance. After inputting the current utterance into the coreference resolution detection sub-model, two sequences as shown in FIG. 2 can be obtained, wherein one sequence is a deletion sequence, comprising two sequences, one sequence being used for indicating whether the position of each word in the current utterance is a starting position (start) of a predicted deletion position, and the other sequence being used for indicating whether the position of each word in the current utterance is an ending position (end) of the predicted deletion position: it can be seen from FIG. 2 that in the first sequence of the deletion sequence, the position corresponding to "这" (this) is 1; it is indicated that the position corresponding to "这" (this) is the starting position of the predicted deletion position, and in the second sequence, the position corresponding to "演" is 1, indicating that the position corresponding to "演" is the ending position of the predicted deletion position. Wherein the other sequence is an Insertion sequence, comprising two sequences, one sequence being used for indicating whether the position of each word in the current utterance is a starting position (start) of the predicted insertion position, and the other sequence being used for indicating whether the position of each word in the current utterance is an ending position (end) of the predicted insertion position; and it can be seen from FIG. 2 that in the first sequence of the Insertion sequence, the position corresponding to "还" is 1, indicating that the position corresponding to "还" is the starting position of the predicted insertion position, and in the second sequence, the position corresponding to "还" is 1, which means that the position corresponding to "还" is the ending position of the predicted insertion position, and "还" is both the starting position and the ending position, which means that a word corresponding to a semantic absence needs to be inserted before "还".

Furthermore, in some exemplary embodiments of the present disclosure, in the 01 sequence, the meanings of 0 and 1 may be exchanged.

In an embodiment of the present disclosure, optionally, the binary classification network uses the following formula to determine whether the position of each word in the current utterance is a starting position or an ending position of the predicted insertion position or the predicted deletion position:

$$p_i^{s-l} = \sigma\left(W_s^l h_l[i] + b_s^l\right)$$

$$p_i^{e-l} = \sigma\left(W_e^l h_l[i] + b_e^l\right)$$

where l represents the predicted insertion position or the predicted deletion position, $$p_i^{s-l}$$

represents a starting position, $$p_i^{e-l}$$

represents an ending position, $h_l[i]$ is an encoded vector representation of an i-th word in the current utterance after passing through a transformer encoder, $$W_s^l$$

and $$W_e^l$$

represent weight vectors, $$b_s^l$$

and $$b_e^l$$

represent bias terms, and σ is a sigmoid activation function.

It should be noted that whether the position of each word in the current utterance is the starting position of the predicted insertion position or not, and whether the position of each word in the current utterance is the starting position of the predicted insertion position or not, both adopt a formula $$p_i^{s-l} = \sigma\left(W_s^l h_l[i] + b_s^l\right);$$

however, when using the formula, the weight vector $$W_s^l$$

and/or bias term $$b_s^l$$

in the formula may be different.

Likewise, whether the position of each word in the current utterance is the ending position of the predicted insertion position or not, and whether the position of each word in the current utterance is the ending position of the predicted insertion position or not, both adopt a formula $$p_i^{e\_l} = \sigma(W_e^l h_l[i] + b_e^l);$$

however, when using the formula, the weight vector $$W_e^l$$

and/or bias term $$b_e^l$$

in the formula may be different. In an embodiment of the present disclosure, the transformer encoder may be implemented as follows:

$$h_0 = XW_t + W_p + W_s$$

$$h_l = \text{Transformer}(h_{n-1}), \quad n \in [1, 2, 3, \ldots, N]$$

where $W_t$, $W_p$ and $W_s$ are a word embedding matrix, a position embedding matrix and a paragraph embedding matrix respectively, n represents the number of layers of the transformer encoder: taking the conversation in the above-mentioned content as an example, X represents an input current utterance, comprising three parts, namely, utterance A, utterance B and Current Utterance; and in the embodiment of the present disclosure, when X is input to the transformer encoder, the Utterance A and the Utterance B can be connected by ".", and then input to the transformer encoder in the manner of [CLS] Utterance A. Utterance B [SEP] Current Utterance[SEP].

Figure 3:
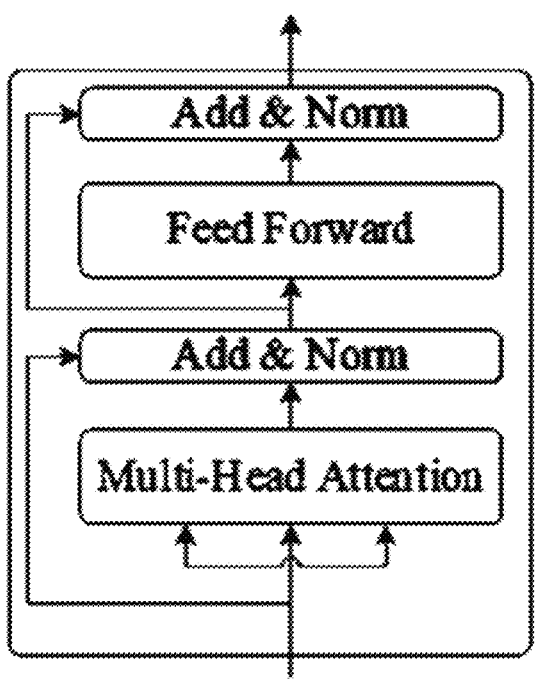
FIG. 3 is a schematic diagram of a transformer encoder according to an embodiment of the present disclosure.

With reference to FIG. 3, FIG. 3 is a schematic diagram of a transformer encoder according to an embodiment of the present disclosure, and the transformer encoder may comprise at least one transformer block as shown in FIG. 3, wherein each transformer block comprises: a multi-head attention layer and a feed forward network, wherein the multi-head attention layer disperses attention calculation into different subspaces so as to enable attention learning from multiple aspects. Both Multi-Head Attention and Feed Forward are followed by a Add & Ivonn layer, which contains the residual structure as well as the layer normalization.

(2) Resolution Completion Sub-Model

The resolution completion sub-model is used to determine, from the historical utterance, a predicted position in the historical utterance of a word corresponding to the semantic absence at the predicted insertion position detected by the coreference resolution detection sub-model and/or a predicted position in the historical utterance of a replacement word corresponding to the word to be replaced at the predicted deletion position.

In the embodiment of the present disclosure, in resolution completion, the mean vector of the starting position or ending position of the detected predicted insertion position and/or predicted deletion position of the current utterance can be used as a condition, and the current utterance encoded by the transformer encoder can be semantically processed by conditional layer normalization (CLN), and then the resolution completion fill-text prediction can be performed by means of machine reading comprehension (MRC).

In an embodiment of the present disclosure, optionally, the inputting the predicted insertion position and/or predicted deletion position of the current utterance, and a historical conversation corresponding to the current utterance into a resolution completion sub-model of the coreference resolution model to obtain a predicted position in the historical utterance of a word corresponding to the semantic absence at the predicted insertion position and/or a predicted position in the historical utterance of a replacement word corresponding to the word to be replaced at the predicted deletion position, comprises:

Step 131: calculating a mean vector of a starting position and an ending position of the predicted insertion position and/or a mean vector of a starting position and an ending position of the predicted deletion position of the current utterance;

Step 132: taking the mean vector as a condition, performing semantic processing on an encoded vector obtained by encoding the current utterance by a transformer encoder by means of conditional layer normalization to obtain a conditional layer normalized semantic output variable; and Step 133: inputting the semantic output variable and the historical utterance of the current utterance into the resolution completion sub-model to obtain a predicted position in the historical utterance of a word corresponding to the semantic absence at the predicted insertion position and/or a predicted position in the historical utterance of a replacement word corresponding to the word to be replaced at the predicted deletion position.

Namely, if it is detected that there is a pre-set insertion position with a semantic absence in the current utterance, a mean vector of a starting position and an ending position of the predicted insertion position is calculated, then the mean vector is taken as a condition, semantic processing is performed on an encoded vector obtained by encoding the current utterance by the transformer encoder by means of conditional layer normalization to obtain a conditional layer normalized semantic output variable, and the semantic output variable and a historical utterance of the current utterance are input into the resolution completion sub-model to obtain a predicted position in the historical utterance of a word corresponding to the semantic absence at the predicted insertion position.

If it is detected that there is a pre-set deletion position of a word to be replaced in a current utterance, a mean vector of a starting position and an ending position of the predicted deletion position is calculated, then the mean vector is taken as a condition, semantic processing is performed on an encoded vector obtained by encoding the current utterance by the transformer encoder by means of conditional layer normalization so as to obtain a conditional layer normalized semantic output variable, and the semantic output variable and a historical utterance of the current utterance are input into the resolution completion sub-model; a predicted position in the historical utterance of a replacement word corresponding to the word to be replaced at the predicted deletion position is obtained.

Optionally, the semantic output variable can be represented as:

$$H_{cln} = \lambda \times (h_{l-1} - \mu_h)/(\sigma_h + \varepsilon) + \beta$$

where $H_{cln}$ is the semantic output variable;

$h_{l-1}$ is an encoded vector obtained by encoding the current utterance by the transformer encoder, $\lambda = \varphi_\lambda(H_c) + \lambda$, $H_c$ is the mean vector; wherein the former $\lambda$ in the formula is equivalent to adding an offset $\varphi_\lambda(H_c)$ to the latter $\lambda$, and the latter $\lambda$ is a fixed value in the trained resolution completion sub-model;

$\beta = \varphi_\beta(H_c) + \beta$, $\varphi_\beta$ and $\varphi_\lambda$ are two transformation matrices, the function is to transform the dimension of an input mean vector into a dimension consistent with $\lambda$ and $\beta$, likewise, the former $\beta$ in the formula is equivalent to adding an offset $\varphi_\beta(H_c)$ to the latter $\beta$, and the latter $\beta$ is a fixed value in the trained resolution completion sub-model;

$H_c = avg(h_l[s], h_l[e])$, $avg()$ represents a mean function, s represents a starting position, and e represents an ending position, and $h_l$ is an encoded vector obtained by encoding the input by the transformer encoder;

$\mu_h$ and $\beta_h$ are a mean value and a variance of feature vectors of different dimensions of the encoded vector corresponding to the current utterance at the current layer, $$\mu_h = 1/H \sum\nolimits_{k=1}^{H} h_{l-1}, \sigma_h = \sqrt{1/H \sum\nolimits_{k=1}^{H} (h_{l-1} - \mu_h)^2},$$

H being a hidden layer dimension, and k being equal to 1 to H;

$\varepsilon$ is a minimum (prevent the denominator from being 0).

Optionally, the resolution completion sub-model determines the predicted position in the historical utterance using the following formula:

$$p_s = softmax(W_s H_{cln} + b_s)$$

$$p_e = softmax(W_e H_{cln} + b_e)$$

where $p_s$ is a starting position of the predicted position in the historical utterance, $p_e$ is an ending position of the predicted position in the historical utterance, softmax is a normalized exponential function. $W_s$ and $W_e$ represent weight vectors, $b_s$ and $b_e$ represent bias terms, and $H_{cln}$ is the semantic output variable.

It should be noted that the starting position of the predicted position in the historical utterance of the word corresponding to the semantic absence at the predicted insertion position and the starting position of the predicted position in the historical utterance of the replacement word corresponding to the word to be replaced at the predicted deletion position both adopt a formula $p_s = softmax(W_s H_{cln} + b_s)$, but when using the formula, the weight vector $W_s$ and/or bias term $b_s$ in the formula may be different.

Likewise, the ending position of the predicted position in the historical utterance of the word corresponding to the semantic absence at the predicted insertion position and the ending position of the predicted position in the historical utterance of the replacement word corresponding to the word to be replaced at the predicted deletion position both adopt a formula $p_e = softmax(W_e H_{cln} + b_e)$, but when using the formula, the weight vector $W_e$ and/or bias term $b_e$ in the formula may be different.

With reference to FIG. 4, an embodiment of the present disclosure further provides a method for training a coreference resolution model, comprising:

Step 41: acquiring a plurality of conversation samples, wherein each of the conversation samples comprises a historical utterance, a current utterance and a reference utterance of the current utterance, and the reference utterance is an utterance after semantic deletion completion and/or coreference resolution of the current utterance;

Step 42: acquiring annotation data of the conversation sample, wherein the annotation data comprises: a real insertion position where there is a semantic absence and/or a real deletion position of a word to be replaced in the current utterance, and a real position in the historical utterance of a word corresponding to the semantic absence at the real insertion position and/or a real position in the historical utterance of a replacement word corresponding to the word to be replaced at the real deletion position;

Step 43: training, according to the current utterance and the annotation data of the conversation sample, a coreference resolution detection sub-model of the coreference resolution model to be trained to obtain a trained coreference resolution detection sub-model, wherein the trained coreference resolution detection sub-model is input with an utterance, and outputs a predicted insertion position where there is a semantic absence and/or a predicted deletion position of a word to be replaced in the input utterance;

Step 44: training, according to the annotation data of the conversation sample and the predicted insertion position and/or the predicted deletion position of the current utterance of the conversation sample, a resolution completion sub-model of the coreference resolution model to be trained to obtain a trained resolution completion sub-model, wherein the trained resolution completion sub-model is input with a predicted insertion position and/or a predicted deletion position of the utterance, and outputs a predicted position in the historical utterance of the input utterance of a word corresponding to the semantic absence at the predicted insertion position and/or a predicted position in the historical utterance of the input utterance of a replacement word corresponding to the word to be replaced at the predicted deletion position.

In the embodiment of the present disclosure, in the training of the coreference resolution model, taking into account the historical utterance of the current utterance to be processed, it is possible to make the trained coreference resolution model perform better in multi-round conversations.

In an embodiment of the present disclosure, optionally, acquiring annotation data of the conversation sample comprises:

Step 421: matching a sub-string in the current utterance of the conversation sample with a sub-string in the reference utterance to obtain a matching result;

Step 422: if the matching result is that a sub-string only exists in the current utterance, determining that the sub-string is a word to be replaced, and a real deletion position of the word to be replaced in the current utterance, finding a replacement font corresponding to the word to be replaced in the reference utterance, and marking a real position in the historical utterance of a replacement word corresponding to the word to be replaced in the historical utterance at the real deletion position; and Step 423: if the matching result is that a sub-string only exists in the reference utterance, determining that there is a semantic absence in the current utterance, and determining a real insertion position where there is a semantic absence in the current utterance.

For example, a conversation sample may be as follows:

A: 是什么电影评 分挺高啊 ? (What movie has such a high rating?)

B: 名字叫贫民 窟的百万富翁， 是洛夫琳坦 丹导演的作品 (Slumdog Millionaire, a work of the director Loveleen Tandan)

A: 还是算了吧 不喜欢这位导演. (Forget it, I do not like this director.)

A+: 贫民窟的百万 富翁还是算了吧, 不喜欢洛夫琳坦丹. (Slumdog Millionaire, forget it, I do not like Loveleen Tandan)

The first two sentences are historical utterances, the third sentence is the current utterance, and the fourth sentence is the reference utterance.

Taking the above conversation sample as an example, the sub-string in the current utterance of the conversation sample "还是算了吧，不喜欢这位导演" (Forget it, I do not like this director) is matched with the sub-string in the reference utterance "贫民窟的百万 富 翁还是算了吧, 不喜欢洛夫琳坦丹" (Slumdog Millionaire, Forget it, I do not like Loveleen Tandan).

(1) If the matching result is that a sub-string exists in the current utterance and the reference utterance at the same time, the part of the sub-string remains unchanged, for example, "还是算了吧不喜欢" (Forget it, I do not like);

(2) If the matching result is that a sub-string only exists in the current utterance, determining that the sub-string is a word to be replaced, and a real deletion position of the word to be replaced in the current utterance, finding a replacement font corresponding to the word to be replaced in the reference utterance, and marking a real position of the word to be replaced corresponding to the word to be replaced in the historical utterance at the real deletion position in the historical utterance, for example, "这位导演" (this director) should be replaced with "洛夫琳坦丹" (Loveleen Tandan);

(3) If the matching result is that a sub-string only exists in the reference utterance, determining that there is a semantic absence in the current utterance, and determining a real insertion position where there is a semantic absence in the current utterance, for example, "贫民窟的百万富翁" needs to be inserted before "还是".

By doing so, annotation data for the training the model can be obtained.

Optionally, training, according to the current utterance and the annotation data of the conversation sample, a coreference resolution detection sub-model of the coreference resolution model to be trained comprises:

an input step: inputting the current utterance of the conversation sample into the coreference resolution detection sub-model to obtain a predicted insertion position where there is a semantic absence of the current utterance and/or a predicted deletion position of a word to be replaced;

determining a value of a first objective function according to the predicted insertion position and/or the predicted deletion position output by the coreference resolution detection sub-model and a real insertion position and/or a real deletion position of the current utterance; and if the value of the first objective function does not satisfy a first condition, adjusting parameters of the coreference resolution detection sub-model, and returning to the input step until the value of the first objective function satisfies the first condition, so as to obtain the trained coreference resolution detection sub-model.

The training method of the coreference resolution detection sub-model and the resolution completion sub-model are described below.

(1) Method for Training Coreference Resolution Detection Sub-Model

In an embodiment of the present disclosure, optionally, the coreference resolution detection sub-model comprises two binary classification networks, wherein one binary classification network is input with the current utterance and outputs a 01 sequence for indicating whether the position of each word in the current utterance is a starting position or an ending position of the predicted insertion position, and the other binary classification network is input with the current utterance and outputs a 01 sequence for indicating whether the position of each word in the current utterance is a starting position or an ending position of the predicted deletion position.

In an embodiment of the present disclosure, optionally, the binary classification network uses the following formula to determine whether the position of each word in the current utterance is a starting position or an ending position of the predicted insertion position or the predicted deletion position:

$$p_i^{s-l} = \sigma\left(W_s^l h_l[i] + b_s^l\right)$$

$$p_i^{e-l} = \sigma\left(W_e^l h_l[i] + b_e^l\right)$$

where l represents the predicted insertion position or the predicted deletion position, $$p_i^{s-l}$$

represents a starting position, $$p_i^{e\_l}$$

represents an ending position, $h_l[i]$ is an encoded vector representation of an i-th word in the current utterance after passing through a transformer encoder, $$W_s^l$$

and $$W_e^l$$

represent weight vectors to be trained, $$b_s^l$$

and $$b_e^l$$

represent bias terms to be trained, and $\sigma$ is a sigmoid activation function.

In an embodiment of the present disclosure, optionally, the first objective function is expressed as follows:

$$\text{loss}_{tag} = -\sum_{i=1}^{n+2} y_i^{s\_l} \, \log\!\left(p_i^{s\_l}\right) - \sum_{j=1}^{n+2} y_i^{e\_l} \, \log\!\left(p_j^{e\_l}\right)$$

where $\text{loss}_{tag}$ is the first objective function, n is the length of the current utterance, $$p_i^{s\_l}$$

represents the starting position of the predicted insertion position or the predicted deletion position, $$p_j^{e\_l}$$

represents an ending position of the predicted insertion position or the predicted deletion position of the current utterance, $$y_i^{s\_l}$$

represents the starting position of the real insertion position or the real deletion position of the current utterance, $$y_j^{e\_l}$$

represents the ending position of the real insertion position or the real deletion position of the current utterance, i represents the i-th word in the current utterance, and j represents the j-th word in the current utterance.

In the formula, n+2 refers to the length occupied by the additional input CLS and SEP when the input mode to transformer is "[CLS] Utterance A, Utterance B [SEP] Current Utterance[SEP]".

Of course, in embodiments of the present application, if other inputs are used, the value of n+2 in the formula may be updated accordingly.

(2) Method for Training Resolution Completion Sub-Model

In an embodiment of the present disclosure, optionally, training, according to the annotation data of the conversation sample and the predicted insertion position and/or the predicted deletion position of the current utterance of the conversation sample, a resolution completion sub-model of the coreference resolution model to be trained comprises:

a preprocessing step: calculating a mean vector of a starting position and an ending position of the predicted insertion position and/or a mean vector of a starting position and an ending position of the predicted deletion position of the current utterance; and taking the mean vector as a condition, performing semantic processing on an encoded vector obtained by encoding the current utterance by a transformer encoder by means of conditional layer normalization to obtain a conditional layer normalized semantic output variable; and an input step: inputting the semantic output variable and the historical utterance of the conversation sample into the resolution completion sub-model to obtain a predicted position in the historical utterance of a word corresponding to the semantic absence at the predicted insertion position and/or a predicted position in the historical utterance of a replacement word corresponding to the word to be replaced at the predicted deletion position; determining a value of a second objective function according to the predicted position and the real position in the historical utterance; and if the value of the second objective function does not satisfy a second condition, adjusting parameters of the resolution completion sub-model, and returning to the input step until the value of the second objective function satisfies the second condition, so as to obtain the trained resolution completion sub-model.

In an embodiment of the present disclosure, optionally, the semantic output variable can be represented as:

$$H_{cln} = \lambda \times (h_{l-1} - \mu_h)/(\sigma_h + \varepsilon) + \beta$$

where $H_{cln}$ is the semantic output variable;

$h_{l-1}$ is an encoded vector obtained by encoding the current utterance by the transformer encoder; the starting value of the index value of the subscript of h is 0, and $h_{l-1}$ represents that the index value of the last layer of the l layer network is l−1.

$\lambda = \varphi_\lambda(H_c) + \lambda$, $H_c$ is the mean vector; wherein the former $\lambda$ in the formula is equivalent to adding an offset $\varphi_\lambda(H_c)$ to the latter $\lambda$, the latter $\lambda$ has an initial value, and the latter $\lambda$ is continuously updated during the training process of the resolution completion sub-model;

$\beta = \varphi_\beta(H_c) + \beta$, $\varphi_\beta$ and $\varphi_\lambda$ are two transformation matrices, the function is to transform the dimension of an input mean vector into a dimension consistent with $\lambda$ and $\beta$; wherein the former $\beta$ in the formula is equivalent to adding an offset $\varphi_\beta(H_c)$ to the latter $\beta$, the latter $\beta$ has an initial value, and the latter $\beta$ is continuously updated during the training process of the resolution completion sub-model.

$H_c = avg(h_l[s], h_l[e])$, avg( ) represents a mean function, s represents a starting position, and e represents an ending position, and $h_l$ is an encoded vector obtained by encoding the input by the transformer encoder;

$\mu_h$ and $\sigma_h$ are a mean value and a variance of feature vectors of different dimensions of the encoded vector corresponding to the current utterance at the current layer, $$\mu_h = 1/H \sum\nolimits_{k=1}^{H} h_{l-1}, \sigma_h = \sqrt{1/H \sum\nolimits_{k=1}^{H} (h_{l-1} - \mu_h)^2},$$

H being a hidden layer dimension, and k being equal to 1 to H: h in $\mu_h$ and $\sigma_h$ is the dimension of the network hidden layer;

$\varepsilon$ is a minimum.

In an embodiment of the present disclosure, optionally, the resolution completion sub-model determines the predicted position in the historical utterance using the following formula:

$$p_s = \text{softmax}(W_s H_{cln} + b_s)$$
$$p_e = \text{softmax}(W_e H_{cln} + b_e)$$

where $p_s$ is a starting position of the predicted position in the historical utterance, $p_e$ is an ending position of the predicted position in the historical utterance, softmax is a normalized exponential function, $W_s$ and $W_e$ represent weight vectors to be trained, $b_s$ and $b_e$ represent bias terms to be trained, and $H_{cln}$ is the semantic output variable.

In an embodiment of the present disclosure, optionally, the second objective function is expressed as follows:

$$\text{loss}_{mrc} = -\sum\nolimits_{i=1}^{n+2} y_s \ \log(p_s) - \sum\nolimits_{j=1}^{n+2} y_e \ \log(p_e)$$

where $\text{loss}_{mrc}$ is the second objective function, n is the length of the historical utterance, $p_s$ represents the starting position of the predicted position of the historical utterance, $p_e$ represents the ending position of the predicted position of the historical utterance, $y_s$ represents a starting position of the real position of the historical utterance, $y_e$ represents the ending position of the real position of the historical utterance, i represents the i-th word in the historical utterance, and j represents the j-th word in the historical utterance.

Figure 5:
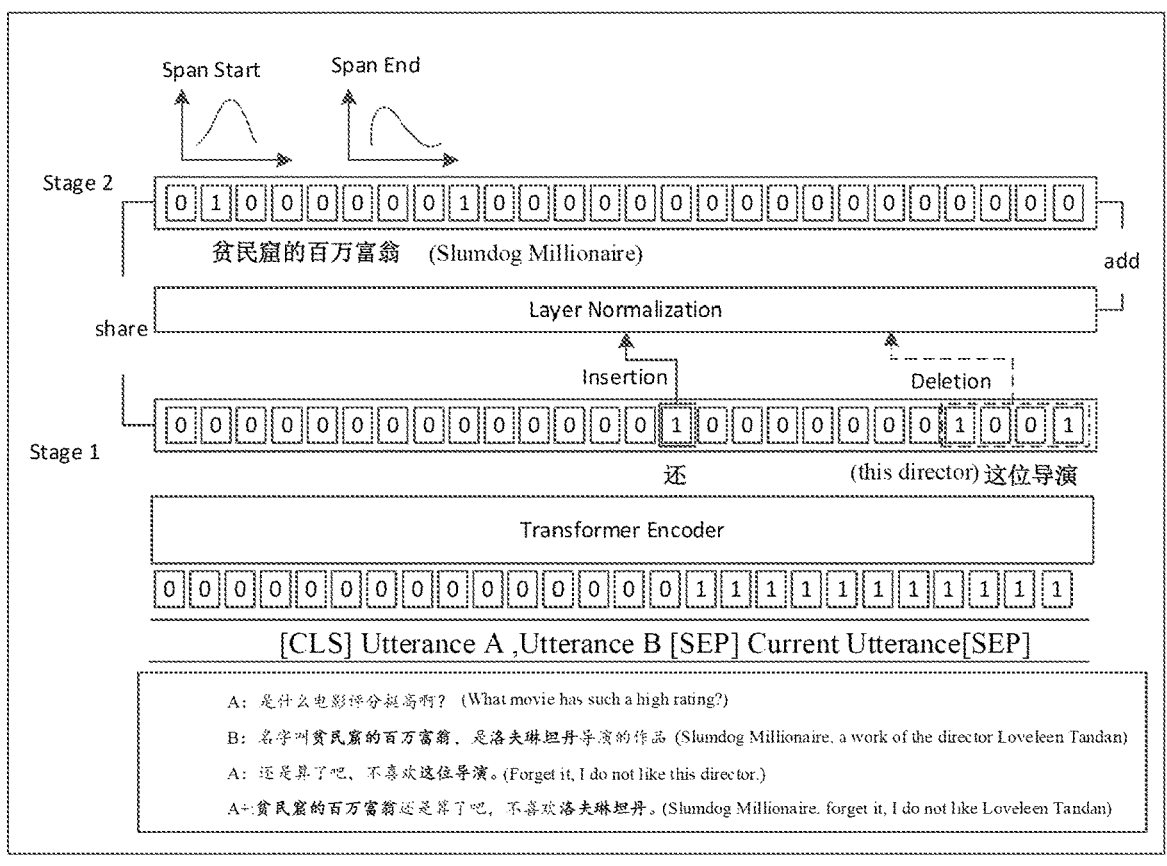
FIG. 5 is a schematic diagram of a specific use scenario for performing coreference resolution with a coreference resolution model according to an embodiment of the present disclosure.

In the embodiment of the present disclosure, two tasks (coreference resolution detection and resolution completion) are multitasked in a cascade structure, namely, in a first stage, the coreference resolution detection task is performed, and in a second stage, the resolution completion task is performed, wherein the two stages of tasks can share the same encoding layer (Transformer Encoder) (see FIG. 5), and training and optimization are performed simultaneously, and the training optimization objective is the sum of the optimization objectives of the two tasks, namely:

$$\text{loss} = \text{loss}_{tag} + \text{loss}_{mrc}$$

through the coreference resolution detection task, the location of the words that need to perform coreference resolution or semantic completion in the current utterance is obtained, and then the semantic information of the coreference resolution words is integrated into the text prediction task of resolution completion through the conditional layer normalization (layer planning), and the full text prediction of resolution completion is performed by means of machine reading comprehension (MRC).

Figure 6:
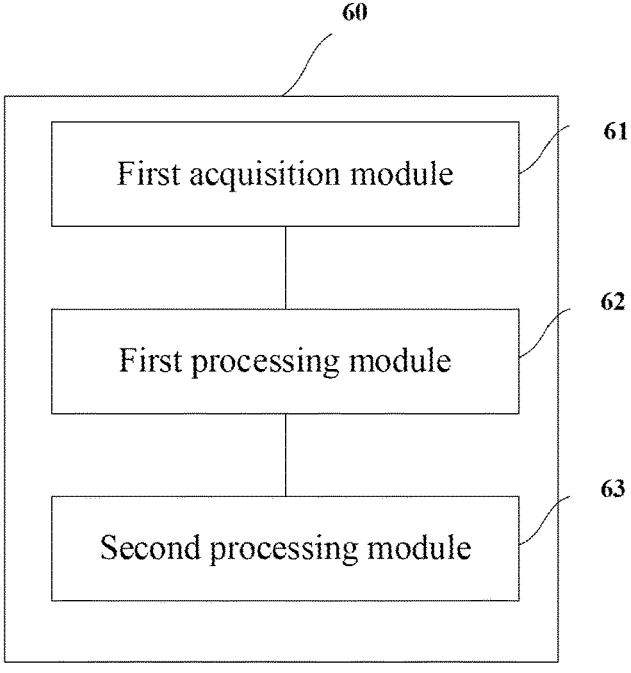
FIG. 6 is a schematic diagram of a coreference resolution apparatus according to an embodiment of the present disclosure.

Referring to FIG. 6, an embodiment of the present disclosure also further provides a coreference resolution apparatus 60, comprising:

a first acquisition module 61 for acquiring a current utterance to be processed;

a first processing module 62 for inputting the current utterance into a coreference resolution detection sub-model of a coreference resolution model to obtain a predicted insertion position where there is a semantic absence of the current utterance and/or a predicted deletion position of a word to be replaced; and a second processing module 63 for inputting the predicted insertion position and/or the predicted deletion position of the current utterance, and a historical conversation corresponding to the current utterance into a resolution completion sub-model of the coreference resolution model to obtain a predicted position in the historical utterance of a word corresponding to the semantic absence at the predicted insertion position and/or a predicted position in the historical utterance of a replacement word corresponding to the word to be replaced at the predicted deletion position.

Optionally, the coreference resolution detection sub-model comprises two binary classification networks, wherein one binary classification network is input with the current utterance and outputs a 01 sequence for indicating whether the position of each word in the current utterance is a starting position or an ending position of the predicted insertion position, and the other binary classification network is input with the current utterance and outputs a 01 sequence for indicating whether the position of each word in the current utterance is a starting position or an ending position of the predicted deletion position.

Optionally, the binary classification network uses the following formula to determine whether the position of each word in the current utterance is a starting position or an ending position of the predicted insertion position or the predicted deletion position:

$$p_i^{s\_l} = \sigma\big(W_s^l h_l[i] + b_s^l\big)$$
$$p_i^{e\_l} = \sigma\big(W_e^l h_l[i] + b_e^l\big)$$

where l represents the predicted insertion position or the predicted deletion position, $$p_i^{s\_l}$$

represents a starting position, $$p_i^{e\_l}$$

represents an ending position, $h_l[i]$ is an encoded vector representation of an i-th word in the current utterance after passing through a transformer encoder, $$W_s^l$$

and $$W_e^l$$

represent weight vectors, $$b_s^l$$

and $$b_e^l$$

represent bias terms, and σ is a sigmoid activation function.

Optionally, the second processing module 63 comprises:

a calculation sub-module 631 for calculating a mean vector of a starting position and an ending position of the predicted insertion position and/or a mean vector of a starting position and an ending position of the predicted deletion position of the current utterance;

first processing sub-module for taking the mean vector as a condition, performing semantic processing on an encoded vector obtained by encoding the current utterance by a transformer encoder by means of conditional layer normalization to obtain a conditional layer normalized semantic output variable; and a second processing sub-module for inputting the semantic output variable and the historical utterance of the current utterance into the resolution completion sub-model to obtain a predicted position in the historical utterance of a word corresponding to the semantic absence at the predicted insertion position and/or a predicted position in the historical utterance of a replacement word corresponding to the word to be replaced at the predicted deletion position.

Optionally, the semantic output variable can be represented as:

$$H_{cln} = \lambda \times (h_{l-1} - \mu_h)/(\sigma_h + \varepsilon) + \beta$$

where $H_{cln}$ is the semantic output variable;

$h_{l-1}$ is an encoded vector obtained by encoding the current utterance by the transformer encoder;

$\lambda = \varphi_\lambda(H_c) + \lambda$, $H_c$ is the mean vector;

$\beta = \varphi_\beta(H_c) + \beta$, $\varphi_\beta$ and $\varphi_\lambda$ are two transformation matrices whose function is to transform the dimension of an input mean vector into a dimension consistent with $\lambda$ and $\beta$;

$H_c$=avg($h_l$[s], $h_l$[e]), avg( ) represents a mean function, s represents a starting position, and e represents an ending position, and $h_l$ is an encoded vector obtained by encoding the input by the transformer encoder;

$\mu_h$ and $\sigma_h$ are a mean value and a variance of feature vectors of different dimensions of the encoded vector corresponding to the current utterance at the current layer, $$\mu_h = 1/H\sum_{k=1}^{H} h_{l-1}, \sigma_h = \sqrt{1/H\sum_{k=1}^{H}(h_{l-1} - \mu_h)^2},$$

H being a hidden layer dimension, and k being equal to 1 to H;

ε is a minimum.

Optionally, the resolution completion sub-model determines the predicted position in the historical utterance using the following formula:

$$p_s = \text{softmax}(W_s H_{cln} + b_s)$$

$$p_e = \text{softmax}(W_s H_{cln} + b_e)$$

where $p_s$ is a starting position of the predicted position in the historical utterance, $p_e$ is an ending position of the predicted position in the historical utterance, softmax is a normalized exponential function, $W_s$ and $W_e$ represent weight vectors, $b_s$ and $b_e$ represent bias terms, and $H_{cln}$ is the semantic output variable.

Figure 7:
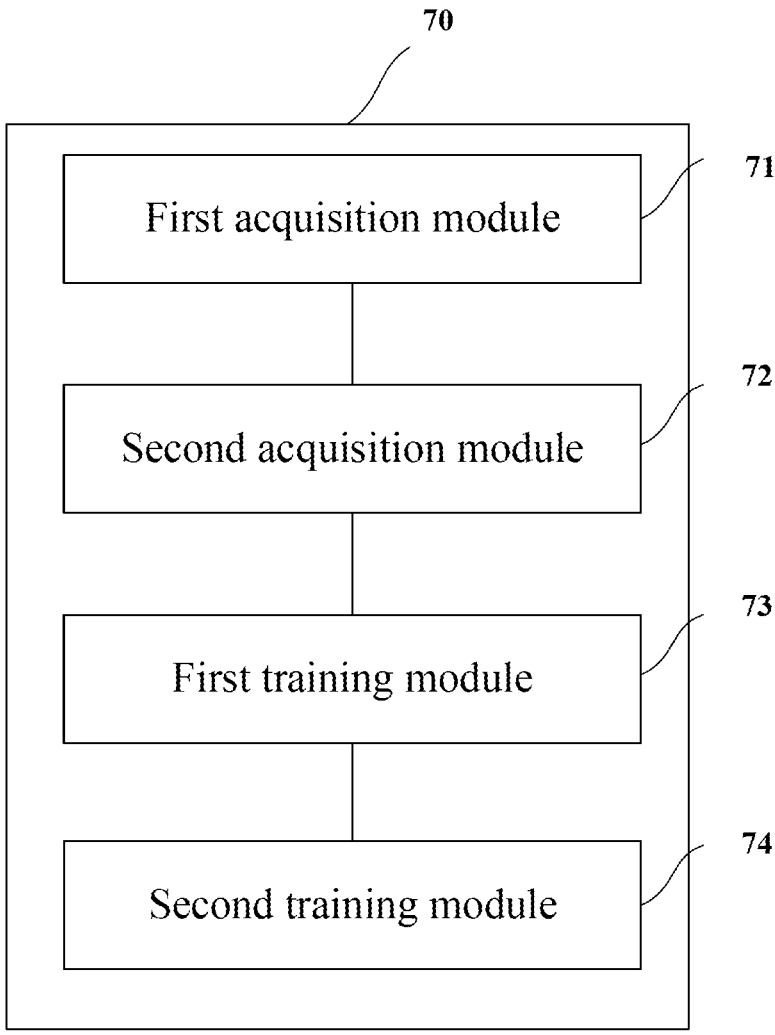
FIG. 7 is a schematic diagram of an apparatus for training a coreference resolution model according to an embodiment of the present disclosure.

Referring to FIG. 7, an embodiment of the present disclosure further provides an apparatus 70 for training a coreference resolution model, comprising:

a first acquisition module 71 for acquiring a plurality of conversation samples, wherein each of the conversation samples comprises a historical utterance, a current utterance and a reference utterance of the current utterance, and the reference utterance is an utterance after semantic deletion completion and/or coreference resolution of the current utterance;

a second acquisition module 72 for acquiring annotation data of the conversation sample, wherein the annotation data comprises: a real insertion position where there is a semantic absence and/or a real deletion position of a word to be replaced in the current utterance, and a real position in the historical utterance of a word corresponding to the semantic absence at the real insertion position and/or a real position in the historical utterance of a replacement word corresponding to the word to be replaced at the real deletion position;

a first training module 73 for training, according to the current utterance and the annotation data of the conversation sample, a coreference resolution detection sub-model of the coreference resolution model to be trained to obtain a trained coreference resolution detection sub-model, wherein the trained coreference resolution detection sub-model is input with an utterance, and outputs a predicted insertion position where there is a semantic absence and/or a predicted deletion position of a word to be replaced in the input utterance; and a second training module 74 for training, according to the annotation data of the conversation sample and the predicted insertion position and/or the predicted deletion position of the current utterance of the conversation sample, a resolution completion sub-model of the coreference resolution model to be trained to obtain a trained resolution completion sub-model, wherein the trained resolution completion sub-model is input with a predicted insertion position and/or a predicted deletion position of the utterance, and outputs a predicted position in the historical utterance of the input utterance of a word corresponding to the semantic absence at the predicted insertion position and/or a predicted position in the historical utterance of the input utterance of a replacement word corresponding to the word to be replaced at the predicted deletion position.

Optionally, the second training module 72 is used for matching a sub-string in the current utterance of the conversation sample with a sub-string in the reference utterance to obtain a matching result; if the matching result is that a sub-string only exists in the current utterance, determining that the sub-string is a word to be replaced, and a real deletion position of the word to be replaced in the current utterance, finding a replacement font corresponding to the word to be replaced in the reference utterance, and marking a real position in the historical utterance of a replacement word corresponding to the word to be replaced in the historical utterance at the real deletion position, and if the matching result is that a sub-string only exists in the reference utterance, determining that there is a semantic absence in the current utterance, and determining a real insertion position where there is a semantic absence in the current utterance.

Optionally; the first training module 73 is used for performing the following operations:

an input step: inputting the current utterance of the conversation sample into the coreference resolution detection sub-model to obtain a predicted insertion position where there is a semantic absence of the current utterance and/or a predicted deletion position of a word to be replaced;

determining a value of a first objective function according to the predicted insertion position and/or the predicted deletion position output by the coreference resolution detection sub-model and a real insertion position and/or a real deletion position of the current utterance; and if the value of the first objective function does not satisfy a first condition, adjusting parameters of the coreference resolution detection sub-model, and returning to the input step until the value of the first objective function satisfies the first condition, so as to obtain the trained coreference resolution detection sub-model.

Optionally, the coreference resolution detection sub-model comprises two binary classification networks, wherein one binary classification network is input with the current utterance and outputs a 01 sequence for indicating whether the position of each word in the current utterance is a starting position or an ending position of the predicted insertion position, and the other binary classification network is input with the current utterance and outputs a 01 sequence for indicating whether the position of each word in the current utterance is a starting position or an ending position of the predicted deletion position.

Optionally, the binary classification network uses the following formula to determine whether the position of each word in the current utterance is a starting position or an ending position of the predicted insertion position or the predicted deletion position:

$$p_i^{s\text{-}l} = \sigma\left(W_s^l h_l[i] + b_s^l\right)$$

-continued $$p_i^{e\text{-}l} = \sigma\left(W_s^l h_l[i] + b_e^l\right)$$

where l represents the predicted insertion position or the predicted deletion position, $$p_i^{s\text{-}l}$$

represents a starting position, $$p_i^{e\text{-}l}$$

represents an ending position, $h_l[i]$ is an encoded vector representation of an i-th word in the current utterance after passing through a transformer encoder, $$W_s^l$$

and $$W_e^l$$

represent weight vectors to be trained, $$b_s^l$$

and $$b_e^l$$

represent bias terms to be trained, and σ is a sigmoid activation function.

Optionally, the first objective function is expressed as follows:

$$\text{loss}_{tag} = -\sum\nolimits_{i=1}^{n+2} y_i^{s\text{-}l}\log\left(p_i^{s\text{-}l}\right) - \sum\nolimits_{j=1}^{n+2} y_j^{e\text{-}l}\log\left(p_j^{e\text{-}l}\right)$$

where $\text{loss}_{tag}$ is the first objective function, n is the length of the current utterance, $$p_i^{s\text{-}l}$$

represents the starting position of the predicted insertion position or the predicted deletion position, $$p_j^{e\text{-}l}$$

represents an ending position of the predicted insertion position or the predicted deletion position of the current utterance, $$y_i^{s\_l}$$

represents the starting position of the real insertion position or the real deletion position of the current utterance, $$y_j^{e\_l}$$

represents the ending position of the real insertion position or the real deletion position of the current utterance, i represents the i-th word in the current utterance, and j represents the j-th word in the current utterance.

Optionally; the second training module 74 is used for performing the following operations:

a preprocessing step: calculating a mean vector of a starting position and an ending position of the predicted insertion position and/or a mean vector of a starting position and an ending position of the predicted deletion position of the current utterance; and taking the mean vector as a condition, performing semantic processing on an encoded vector obtained by encoding the current utterance by a transformer encoder by means of conditional layer normalization to obtain a conditional layer normalized semantic output variable; and an input step: inputting the semantic output variable and the historical utterance of the conversation sample into the resolution completion sub-model to obtain a predicted position in the historical utterance of a word corresponding to the semantic absence at the predicted insertion position and/or a predicted position in the historical utterance of a replacement word corresponding to the word to be replaced at the predicted deletion position; determining a value of a second objective function according to the predicted position and the real position in the historical utterance; and if the value of the second objective function does not satisfy a second condition, adjusting parameters of the resolution completion sub-model, and returning to the input step until the value of the second objective function satisfies the second condition, so as to obtain the trained resolution completion sub-model.

Alternatively, the semantic output variable can be represented as:

$$H_{cln} = \lambda \times (h_{l-1} - \mu_h)/(\sigma_h + \varepsilon) + \beta$$

where $H_{cln}$ is the semantic output variable;

$h_{l-1}$ is an encoded vector obtained by encoding the current utterance by the transformer encoder;

$\lambda = \varphi_\lambda(H_c) + \lambda$, $H_c$ is the mean vector;

$\beta = \varphi_\beta(H_c) + \beta$, $\varphi_\beta$ and $\varphi_\lambda$ are two transformation matrices whose function is to transform the dimension of an input mean vector into a dimension consistent with $\lambda$ and $\beta$;

$H_c = \text{avg}(h_l[s], h_l[e])$, avg( ) represents a mean function, s represents a starting position, and e represents an ending position, and $h_l$ is an encoded vector obtained by encoding the input by the transformer encoder;

$\mu_h$ and $\sigma_h$ are a mean value and a variance of feature vectors of different dimensions of the encoded vector corresponding to the current utterance at the current layer, $$\mu_h = 1/H \sum\nolimits_{k=1}^{H} h_{l-1}, \sigma_h = \sqrt{1/H \sum\nolimits_{k=1}^{H} (h_{l-1} - \mu_h)^2},$$

H being a hidden layer dimension, and k being equal to 1 to H;

ε is a minimum.

Optionally, the resolution completion sub-model determines the predicted position in the historical utterance using the following formula:

$$p_s = \text{softmax}(W_s H_{cln} + b_s)$$
$$p_e = \text{softmax}(W_s H_{cln} + b_e)$$

where $p_s$ is a starting position of the predicted position in the historical utterance, $p_e$ is an ending position of the predicted position in the historical utterance, softmax is a normalized exponential function, $W_s$ and $W_e$ represent weight vectors to be trained, $b_s$ and $b_e$ represent bias terms to be trained, and $H_{cln}$ is the semantic output variable.

Optionally, the second objective function is expressed as follows:

$$\text{loss}_{mrc} = -\sum\nolimits_{i=1}^{n+2} y_s \log(p_s) - \sum\nolimits_{j=1}^{n+2} y_e \log(p_e)$$

where $\text{loss}_{mrc}$ is the second objective function, n is the length of the historical utterance, $p_s$ represents the starting position of the predicted position of the historical utterance, $p_c$ represents the ending position of the predicted position of the historical utterance, $y_s$ represents a starting position of the real position of the historical utterance, $y_e$ represents the ending position of the real position of the historical utterance, i represents the i-th word in the historical utterance, and j represents the j-th word in the historical utterance.

Figure 8:
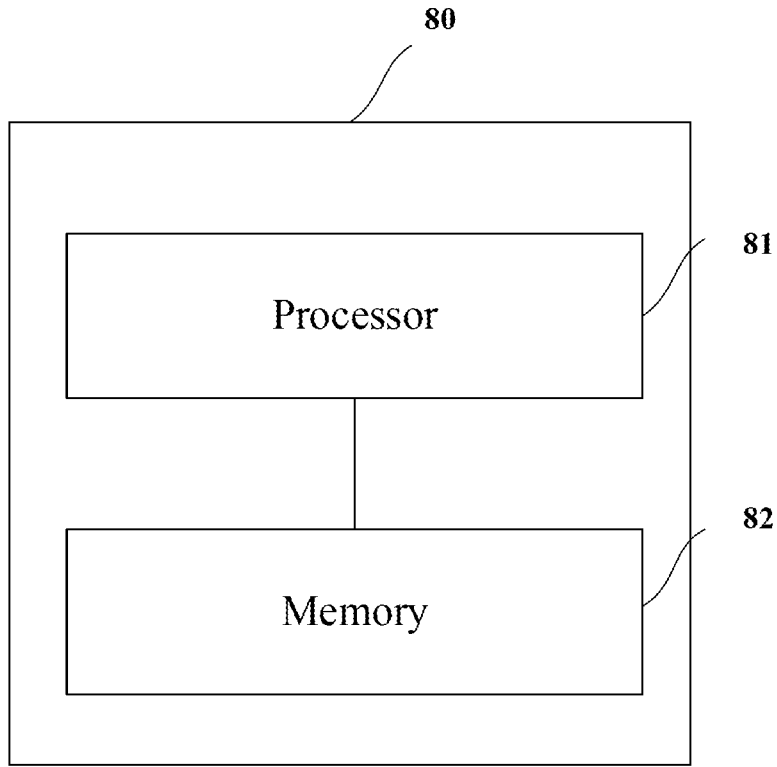
FIG. 8 is a schematic diagram of an electronic device according to an embodiment of the present disclosure.

Referring to FIG. 8, an embodiment of the present disclosure also provides an electronic device 80 comprising a processor 81, a memory 82, and a program or instructions stored on the memory 82 and executable on the processor 81 which, when executed by the processor 81, carry out the steps of the coreference resolution method as described above, or when executed by the processor 81, carry out the steps of the method for training a coreference resolution model as described above.

Embodiments of the present disclosure provide a readable storage medium having stored thereon a program or instructions which, when executed by a processor, implement the coreference resolution method as described above, or implement the steps of the method for training a coreference resolution model as described above.

The readable storage medium includes a computer readable storage medium such as a computer read only memory (ROM), a random access memory (RAM), a magnetic or optical disk, etc.

It should be noted that, as used herein, the terms "comprise", "include", or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element. Furthermore, it should be noted that the scope of the methods and apparatus in the embodiments of the present application is not limited to the order of performing the functions shown or discussed, and may include performing the functions in a substantially simultaneous manner or in a reverse order depending on the functionality involved, e.g., the methods described may be performed in a different order than described and various steps may be added, omitted, or combined. In addition, features described with reference to certain examples may be combined in other examples.

From the description of the embodiments given above, it will be clear to a person skilled in the art that the method of the embodiments described above can be implemented by means of software plus a necessary general purpose hardware platform, but of course also by means of hardware, the former being in many cases a better embodiment. Based on such an understanding, the technical solution of the present application, in essence or in part contributing to the prior art, can be embodied in the form of a computer software product stored in a storage medium (such as a ROM/RAM, a magnetic diskette, an optical disk), comprising instructions for causing a terminal (which can be a mobile phone, a computer, a server, an air conditioner, or a network device, etc.) to execute a method according to various embodiments of the present application.

Although the embodiments of the present disclosure have been described above with reference to the accompanying drawings, the present disclosure is not limited to the above-mentioned specific embodiments, which are merely illustrative and not restrictive, and those skilled in the art, with inspiration from the present disclosure, can make many changes without departing from the spirit and scope of the present disclosure and the appended claims.

What is claimed is:

1. A coreference resolution method, comprising:
acquiring a current utterance to be processed;
inputting the current utterance into a coreference resolution detection sub-model of a coreference resolution model to obtain at least one of a predicted insertion position where there is a semantic absence of the current utterance and a predicted deletion position of a word to be replaced; and
inputting at least one of the predicted insertion position and the predicted deletion position of the current utterance, and a historical conversation corresponding to the current utterance into a resolution completion sub-model of the coreference resolution model to obtain at least one of a predicted position in the historical utterance of a word corresponding to the semantic absence at the predicted insertion position and a predicted position in the historical utterance of a replacement word corresponding to the word to be replaced at the predicted deletion position;
wherein the inputting at least one of the predicted insertion position and the predicted deletion position of the current utterance, and a historical conversation corresponding to the current utterance into a resolution completion sub-model of the coreference resolution model to obtain at least one of a predicted position in the historical utterance of a word corresponding to the semantic absence at the predicted insertion position and a predicted position in the historical utterance of a replacement word corresponding to the word to be replaced at the predicted deletion position, comprises:
calculating at least one of a mean vector of a starting position and an ending position of the predicted insertion position and a mean vector of a starting position and an ending position of the predicted deletion position of the current utterance;
taking the mean vector as a condition, performing semantic processing on an encoded vector obtained by encoding the current utterance by a transformer encoder by means of conditional layer normalization to obtain a conditional layer normalized semantic output variable; and
inputting the semantic output variable and the historical utterance of the current utterance into the resolution completion sub-model to obtain at least one of a predicted position in the historical utterance of a word corresponding to the semantic absence at the predicted insertion position and a predicted position in the historical utterance of a replacement word corresponding to the word to be replaced at the predicted deletion position.

2. The method according to claim 1, wherein the coreference resolution detection sub-model comprises two binary classification networks, wherein one binary classification network is input with the current utterance and outputs a 01 sequence for indicating whether the position of each word in the current utterance is a starting position or an ending position of the predicted insertion position, and the other binary classification network is input with the current utterance and outputs a 01 sequence for indicating whether the position of each word in the current utterance is a starting position or an ending position of the predicted deletion position.

3. The method according to claim 2, wherein the binary classification network uses the following formula to determine whether the position of each word in the current utterance is a starting position or an ending position of the predicted insertion position or the predicted deletion position:

$$p_i^{s\_l} = \sigma\!\left(W_s^l h_l[i] + b_s^l\right)$$
$$p_i^{e\_l} = \sigma\!\left(W_s^l h_l[i] + b_e^l\right)$$

where l represents the predicted insertion position or the predicted deletion position, $$p_i^{s\_l}$$

represents a starting position, $$p_i^{e\_l}$$

represents an ending position, $h_l[i]$ is an encoded vector representation of an i-th word in the current utterance after passing through a transformer encoder, $$W_s^l$$

and $$W_e^1$$

represent weight vectors, $$b_s^1$$

and $$b_e^1$$

represent bias terms, and $\sigma$ is a sigmoid activation function.

4. The method according to claim 1, wherein the semantic output variable can be represented as:

$$H_{cln} = \lambda \times (h_{l-1} - \mu_h)/(\sigma_h + \varepsilon) + \beta$$

where $H_{cln}$ is the semantic output variable;

$h_{l-1}$ is an encoded vector obtained by encoding the current utterance by the transformer encoder;

$\lambda = \varphi_\lambda(H_c) + \lambda$, $H_c$ is the mean vector;

$\beta = \varphi_\beta(H_c) + \beta$, $\varphi_B$ and $\varphi_\lambda$ are two transformation matrices whose function is to transform the dimension of an input mean vector into a dimension consistent with $\lambda$ and $\beta$;

$H_c = \text{avg}(h_l[s], h_l[e])$, avg( ) represents a mean function, s represents a starting position, and e represents an ending position, and $h_l$ is an encoded vector obtained by encoding the input by the transformer encoder;

$\mu_h$ and $\sigma_h$ are a mean value and a variance of feature vectors of different dimensions of the encoded vector corresponding to the current utterance at the current layer, $$\mu_h = 1/H \sum\nolimits_{k=1}^{H} h_{l-1}, \sigma_h = \sqrt{1/H \sum\nolimits_{k=1}^{H} (h_{l-1} - \mu_h)^2},$$

H being a hidden layer dimension, and k being equal to 1 to H;

$\varepsilon$ is a minimum.

5. The method according to claim 1, wherein the resolution completion sub-model determines the predicted position in the historical utterance using the following formula:

$$p_s = \text{softmax}(W_s H_{cln} + b_s)$$

$$p_e = \text{softmax}(W_s H_{cln} + b_e)$$

where $p_s$ is a starting position of the predicted position in the historical utterance, $p_e$ is an ending position of the predicted position in the historical utterance, softmax is a normalized exponential function, $W_s$ and $W_e$ represent weight vectors, $b_s$ and $b_e$ represent bias terms, and $H_{cln}$ is the semantic output variable.

6. A method for training a coreference resolution model, comprising:

acquiring a plurality of conversation samples, wherein each of the conversation samples comprises a historical utterance, a current utterance and a reference utterance of the current utterance, and the reference utterance is an utterance after at least one of semantic deletion completion and coreference resolution of the current utterance;

acquiring annotation data of the conversation sample, wherein the annotation data comprises: at least one of a real insertion position where there is a semantic absence and a real deletion position of a word to be replaced in the current utterance, and at least one of a real position in the historical utterance of a word corresponding to the semantic absence at the real insertion position and a real position in the historical utterance of a replacement word corresponding to the word to be replaced at the real deletion position;

training, according to the current utterance and the annotation data of the conversation sample, a coreference resolution detection sub-model of the coreference resolution model to be trained to obtain a trained coreference resolution detection sub-model, wherein the trained coreference resolution detection sub-model is input with an utterance, and outputs at least one of a predicted insertion position where there is a semantic absence and a predicted deletion position of a word to be replaced in the input utterance;

training, according to the annotation data of the conversation sample and at least one of the predicted insertion position and the predicted deletion position of the current utterance of the conversation sample, a resolution completion sub-model of the coreference resolution model to be trained to obtain a trained resolution completion sub-model, wherein the trained resolution completion sub-model is input with at least one of a predicted insertion position and a predicted deletion position of the utterance, and outputs a predicted position in the historical utterance of the input utterance of a word corresponding to the semantic absence at at least one of the predicted insertion position and a predicted position in the historical utterance of the input utterance of a replacement word corresponding to the word to be replaced at the predicted deletion position;

wherein training, according to the annotation data of the conversation sample and at least one of the predicted insertion position and the predicted deletion position of the current utterance of the conversation sample, a resolution completion sub-model of the coreference resolution model to be trained comprises:

a preprocessing step: calculating at least one of a mean vector of a starting position and an ending position of the predicted insertion position and a mean vector of a starting position and an ending position of the predicted deletion position of the current utterance; and taking the mean vector as a condition, performing semantic processing on an encoded vector obtained by encoding the current utterance by a transformer encoder by means of conditional layer normalization to obtain a conditional layer normalized semantic output variable; and an input step: inputting the semantic output variable and the historical utterance of the conversation sample into the resolution completion sub-model to obtain at least one of a predicted position in the historical utterance of a word corresponding to the semantic absence at the predicted insertion position and a predicted position in the historical utterance of a replacement word corresponding to the word to be replaced at the predicted deletion position; determining a value of a second objective function according to the predicted position and the real position in the historical utterance; and if the value of the second objective function does not satisfy a second condition, adjusting parameters of the resolution completion sub-model, and returning to the input step until the value of the second objective function satisfies the second condition, so as to obtain the trained resolution completion sub-model.

7. The method according to claim 6, wherein the acquiring annotation data of the conversation sample comprises:

matching a sub-string in the current utterance of the conversation sample with a sub-string in the reference utterance to obtain a matching result;

if the matching result is that a sub-string only exists in the current utterance, determining that the sub-string is a word to be replaced, and a real deletion position of the word to be replaced in the current utterance, finding a replacement font corresponding to the word to be replaced in the reference utterance, and marking a real position in the historical utterance of a replacement word corresponding to the word to be replaced in the historical utterance at the real deletion position; and if the matching result is that a sub-string only exists in the reference utterance, determining that there is a semantic absence in the current utterance, and determining a real insertion position where there is a semantic absence in the current utterance.

8. The method according to claim 6, wherein the training, according to the current utterance and the annotation data of the conversation sample, a coreference resolution detection sub-model of the coreference resolution model to be trained comprises:

an input step: inputting the current utterance of the conversation sample into the coreference resolution detection sub-model to obtain at least one of a predicted insertion position where there is a semantic absence of the current utterance and a predicted deletion position of a word to be replaced;

determining a value of a first objective function according to at least one of the predicted insertion position and the predicted deletion position output by the coreference resolution detection sub-model and at least one of a real insertion position and a real deletion position of the current utterance; and if the value of the first objective function does not satisfy a first condition, adjusting parameters of the coreference resolution detection sub-model, and returning to the input step until the value of the first objective function satisfies the first condition, so as to obtain the trained coreference resolution detection sub-model.

9. The method according to claim 8, wherein the coreference resolution detection sub-model comprises two binary classification networks, wherein one binary classification network is input with the current utterance and outputs a 01 sequence for indicating whether the position of each word in the current utterance is a starting position or an ending position of the predicted insertion position, and the other binary classification network is input with the current utterance and outputs a 01 sequence for indicating whether the position of each word in the current utterance is a starting position or an ending position of the predicted deletion position.

10. The method according to claim 9, wherein the binary classification network uses the following formula to determine whether the position of each word in the current utterance is a starting position or an ending position of the predicted insertion position or the predicted deletion position:

$$p_i^{s-l} = \sigma\left(W_s^l h_l[i] + b_s^l\right)$$
$$p_i^{e-l} = \sigma\left(W_s^l h_l[i] + b_e^l\right)$$

where l represents the predicted insertion position or the predicted deletion position, $$p_i^{s-1}$$

represents a starting position, $$p_i^{e-1}$$

represents an ending position, $h_l[i]$ is an encoded vector representation of an i-th word in the current utterance after passing through a transformer encoder, $$W_s^1$$

and $$W_e^1$$

represent weight vectors to be trained, $$b_s^1$$

and $$b_e^1$$

represent bias terms to be trained, and σ is a sigmoid activation function.

11. The method according to claim 8, wherein the first objective function is expressed as follows:

$$\text{loss}_{tag} = -\sum_{i=1}^{n+2} y_i^{s-l}\log(p_i^{s-l}) - \sum_{j=1}^{n+2} y_j^{e-l}\log(p_j^{e-l})$$

where $\text{loss}_{tag}$ is the first objective function, n is the length of the current utterance, $$p_i^{s-1}$$

35 represents the starting position of the predicted insertion position or the predicted deletion position, $$p_i^{e-1}$$

represents an ending position of the predicted insertion position or the predicted deletion position of the current utterance, $$y_i^{s-1}$$

represents the starting position of the real insertion position or the real deletion position of the current utterance, $$y_i^{e-1}$$

represents the ending position of the real insertion position or the real deletion position of the current utterance, i represents the i-th word in the current utterance, and j represents the j-th word in the current utterance.

12. The method according to claim 6, wherein the semantic output variable can be represented as:

$$H_{cln} = \lambda \times (h_{l-1} - \mu_h)/(\sigma_h + \varepsilon) + \beta$$

where $H_{cln}$ is the semantic output variable;

$h_{l-1}$ is an encoded vector obtained by encoding the current utterance by the transformer encoder;

$\lambda = \varphi_\lambda(H_c) + \lambda$, $H_c$ is the mean vector;

$\beta = \varphi_\beta(H_c) + \beta$, $\varphi_\beta$ and $\varphi_\lambda$ are two transformation matrices whose function is to transform the dimension of an input mean vector into a dimension consistent with $\lambda$ and $\beta$;

$H_c = avg(h_l[s], h_l[e])$, $avg(\ )$ represents a mean function, s represents a starting position, and e represents an ending position, and $h_l$ is an encoded vector obtained by encoding the input by the transformer encoder;

$\mu_h$ and $\sigma_h$ are a mean value and a variance of feature vectors of different dimensions of the encoded vector corresponding to the current utterance at the current layer, $$\mu_h = 1/H \sum\nolimits_{k=1}^{H} h_{l-1}, \sigma_h = \sqrt{1/H \sum\nolimits_{k=1}^{H} (h_{l-1} - \mu_h)^2},$$

H being a hidden layer dimension, and k being equal to 1 to H;

$\varepsilon$ is a minimum.

13. The method according to claim 6, wherein the resolution completion sub-model determines the predicted position in the historical utterance using the following formula:

36

$$p_s = \mathrm{softmax}(W_s H_{cln} + b_s)$$

$$p_e = \mathrm{softmax}(W_s H_{cln} + b_e)$$

where $p_s$ is a starting position of the predicted position in the historical utterance, $p_e$ is an ending position of the predicted position in the historical utterance, softmax is a normalized exponential function, $W_s$ and $W_e$ represent weight vectors to be trained, $b_s$ and $b_e$ represent bias terms to be trained, and $H_{cln}$ is the semantic output variable.

14. The method according to claim 6, wherein the second objective function is expressed as follows:

$$\mathrm{loss}_{mrc} = -\sum_{i=1}^{n+2} y_s \log(p_s) - \sum_{j=1}^{n+2} y_e \log(p_e)$$

where $\mathrm{loss}_{mrc}$ is the second objective function, n is the length of the historical utterance, $p_s$ represents the starting position of the predicted position of the historical utterance, $p_e$ represents the ending position of the predicted position of the historical utterance, $y_s$ represents a starting position of the real position of the historical utterance, $y_e$ represents the ending position of the real position of the historical utterance, i represents the i-th word in the historical utterance, and j represents the j-th word in the historical utterance.

15. An electronic device comprising a processor, a memory and a program or instructions stored on the memory and executable on the processor which, when executed by the processor, to perform:

acquiring a current utterance to be processed;

inputting the current utterance into a coreference resolution detection sub-model of a coreference resolution model to obtain at least one of a predicted insertion position where there is a semantic absence of the current utterance and a predicted deletion position of a word to be replaced; and inputting at least one of the predicted insertion position and the predicted deletion position of the current utterance, and a historical conversation corresponding to the current utterance into a resolution completion sub-model of the coreference resolution model to obtain at least one of a predicted position in the historical utterance of a word corresponding to the semantic absence at the predicted insertion position and a predicted position in the historical utterance of a replacement word corresponding to the word to be replaced at the predicted deletion position;

wherein the inputting at least one of the predicted insertion position and the predicted deletion position of the current utterance, and a historical conversation corresponding to the current utterance into a resolution completion sub-model of the coreference resolution model to obtain at least one of a predicted position in the historical utterance of a word corresponding to the semantic absence at the predicted insertion position and a predicted position in the historical utterance of a replacement word corresponding to the word to be replaced at the predicted deletion position, comprises:

calculating at least one of a mean vector of a starting position and an ending position of the predicted insertion position and a mean vector of a starting position and an ending position of the predicted deletion position of the current utterance;

taking the mean vector as a condition, performing semantic processing on an encoded vector obtained by encoding the current utterance by a transformer encoder by means of conditional layer normalization to obtain a conditional layer normalized semantic output variable; and inputting the semantic output variable and the historical utterance of the current utterance into the resolution completion sub-model to obtain at least one of a predicted position in the historical utterance of a word corresponding to the semantic absence at the predicted insertion position and a predicted position in the historical utterance of a replacement word corresponding to the word to be replaced at the predicted deletion position.

16. A non-transitory readable storage medium having stored thereon a program or instructions which, when executed by a processor, implement the steps of the coreference resolution method of claim 1.

17. An electronic device comprising a processor, a memory and a program or instructions stored on the memory and executable on the processor which, when executed by the processor, carry out the steps of the method for training a coreference resolution model of claim 6.

18. A non-transitory readable storage medium having stored thereon a program or instructions which, when executed by a processor, implement the steps of the method for training a coreference resolution model of claim 6.

* * * * *